US006624802B1

(12) United States Patent
Klein et al.

(10) Patent No.: US 6,624,802 B1
(45) Date of Patent: Sep. 23, 2003

(54) METHOD AND DEVICE FOR DETECTING SPECIFIC STATES OF MOVEMENT OF A USER

(76) Inventors: Maximilian Klein, Rümannstrasse 59, D-80804 München (DE); Peter Lutz, Rümannstrasse 2, D-80804 München (DE)

( * ) Notice: Subject to any disclaimer, the term of this patent is extended or adjusted under 35 U.S.C. 154(b) by 179 days.

(21) Appl. No.: 09/390,996
(22) Filed: Sep. 7, 1999

Related U.S. Application Data

(63) Continuation of application No. PCT/EP98/01216, filed on Mar. 4, 1998.

(30) Foreign Application Priority Data

Mar. 7, 1997  (DE) .......................................... 197 09 456

(51) Int. Cl.⁷ ................................................ G09G 5/00
(52) U.S. Cl. ........................... 345/156; 463/36; 463/31; 273/109; 273/148
(58) Field of Search ..................... 345/156; 463/36–38, 463/31, 6; 273/109, 110, 148

(56) References Cited

U.S. PATENT DOCUMENTS

| | | |
|---|---|---|
| 4,488,017 A | 12/1984 | Lee |
| 4,631,599 A * | 12/1986 | Cawkell ..................... 358/285 |
| 4,660,828 A | 4/1987 | Weiss |
| 4,817,950 A | 4/1989 | Goo |
| 5,049,079 A * | 9/1991 | Furtado et al. ............. 434/253 |
| 5,159,556 A * | 10/1992 | Schorter ...................... 364/449 |
| 5,283,555 A | 2/1994 | Ward et al. |
| 5,394,517 A * | 2/1995 | Kalawsky .................... 395/129 |
| 5,405,152 A | 4/1995 | Katanics et al. |
| 5,409,226 A | 4/1995 | Mesko et al. |
| 5,613,690 A * | 3/1997 | McShane et al. ........... 273/449 |
| 5,860,861 A * | 1/1999 | Lipps et al. .................. 463/36 |

FOREIGN PATENT DOCUMENTS

| | | |
|---|---|---|
| DE | 4336153 | 3/1995 |
| DE | 4445861 | 6/1996 |
| EP | 761266 | 3/1997 |
| GB | 2038597 | 7/1980 |
| WO | 96/01448 | 1/1996 |
| WO | 96/06664 | 3/1996 |
| WO | 96/35494 | 11/1996 |
| WO | 96/36955 | 11/1996 |

\* cited by examiner

Primary Examiner—Amare Mengistu
Assistant Examiner—Jimmy H. Nguyen
(74) Attorney, Agent, or Firm—Greenblum & Bernstein, P.L.C.

(57) ABSTRACT

Process and device for producing input data for a data processing system in which a user stands, sits, kneels, etc. with his entire body on a support plate of a bearing device, such that this support plate is mounted on a base plate which can tilt and/or turn and/or move in the vertical direction. The movements of the support plate according to these degrees of freedom of movement are controlled by the user through the latter shifting his body weight, exerting torques, jumping, etc. A sensor device detects the movements of the support plate and generates corresponding sensor signals, which are fed to the data processing system.

77 Claims, 5 Drawing Sheets

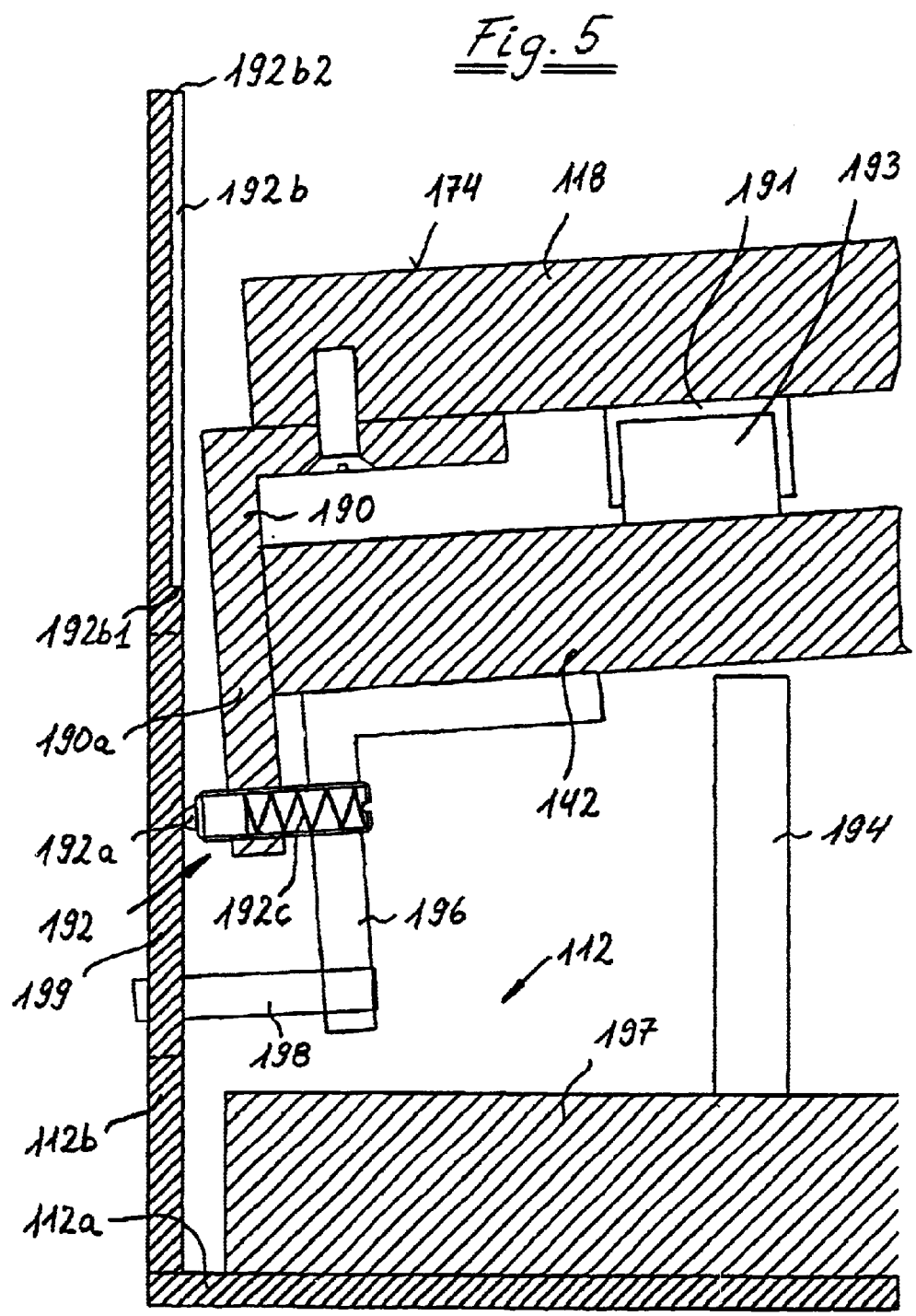

METHOD AND DEVICE FOR DETECTING SPECIFIC STATES OF MOVEMENT OF A USER

CROSS-REFERENCE TO RELATED APPLICATIONS

The present application is a continuation of International Application No. PCT/EP98/01216 filed Mar. 4, 1998, the disclosure of which is expressly incorporated by reference herein in its entirety, which claims priority under 35 U.S.C. § 119 of German Patent Application No. 197 09 456.2, filed Mar. 7, 1997.

BACKGROUND OF THE INVENTION

1. Field of the Invention

The invention relates to a device for detecting certain states of movement of the body of a user and for generating signals corresponding to the result of the detection for subsequent processing in a data processing system, and utilizes a bearing device for the body of the user, which device includes a support unit which is mounted in a tiltable manner on a base part and has a support surface for supporting the body of the user, and a sensor device for detecting the direction and the magnitude of the position of the projection of the body's center of gravity into the support surface relative to a predetermined original position in the support surface from the direction and the magnitude of a tilt of the support surface and for generating corresponding sensor signals.

2. Discussion of Background Information

Generally known devices for detecting certain states of movement of a user are designed to be operated by hand (e.g. mouse, joystick or trackball) or by foot (see, for example, DE 43 36 153 C1 or DE 44 45 861 A1) and simply require the motoricity of individual extremities. This is of advantage when operating a data processing system with a conventional visual display unit in so far as the user is thus able to keep his head still and fix his eyes on the screen of the visual display unit.

However where certain applications are concerned, for example in the case of computer games or computer-aided design (CAD), visual output will in future take place to an increasing degree via visual display units which are secured to the user's head, fill his entire field of vision, detect the movements of the user's head and adapt the screen display to the detected head movements (so-called cyber-helmets). The purpose of this technology is to give the user the impression that he is in a virtual space (cyberspace) and thus create the illusion of virtual reality.

However the user of cyber-helmets of this kind no longer has to adopt a certain posture relative to the visual display unit. The impression of virtual reality is more likely to suffer if locomotion in this virtual space cannot be controlled by corresponding real movements of the legs and of the body of the user. Particularly unsatisfactory solutions are those which employ so-called cyber-gloves to detect hand or arm movements in order to control not just manual actions in virtual space, but also locomotion in this virtual space by, for example, indicating the desired direction.

A great many devices have therefore been proposed in the prior art which are able to detect movements of the legs and the body of the user and provide corresponding detection signals for subsequent processing in a data processing system, for example a personal computer. A device of this kind is known from WO-A-96/06664. In this device a support surface for supporting the body of the user is mounted in a tiltable manner on a base plate by a universal joint, which prevents the support surface from turning about a vertical axis. A conventional joystick, to the operating lever of which a ball is secured, is disposed at some distance from the universal joint. The ball is held in a sliding manner in a shaft which is connected to the support surface, so that, by using the joystick, shifts of the center of gravity of the user can be detected on the basis of the resulting tilting of the support surface. However this known device is restricted to detecting two degrees of freedom of movement, for example direction and magnitude of the shift of the center of gravity.

U.S. Pat. No. 4,817,950, U.S. Pat. No. 4,488,017, U.S. Pat. No. 5,405,152, WO-A-96/35494, EP-A-0 761 266 and U.S. Pat. No. 5,409,226 disclose further known devices which, like the device according to WO-A-96/06664, serve to detect only just two degrees of freedom of a shift of the center of gravity of the user, although in each case different mounting and sensor mechanisms are used.

The device known from WO-A-96/35494 differs from the other devices of the prior art in particular by the interpretation of the sensor signals at the subsequent data processing stage.

The devices described in U.S. Pat. No. 5,405,152 and U.S. Pat. No. 4,509,226 are not only formed as a sensor device for detecting the shift of the center of gravity of the user, but also comprise actuating devices which enable the user to be physically informed of changing boundary conditions of the computer simulation, for example a change from flat to hilly terrain, reactions of the computer simulation to his movements, etc.

WO-A-96/36955 discloses a device which enables the user to execute actual walking movements and, according to the deviation of the user, due to the walking, from a predetermined original position, actuating devices provided in the support surface are operated such that the user is returned to the predetermined original position, in spite of the walking movement.

GB-A-2 038 597 discloses a device of a similar type in which just one degree of freedom of the movement of the user, for example a rotation about a vertical axis, is detected and converted into a corresponding signal.

Since the known devices discussed above only enable two degrees of freedom to be detected, or even just one in the case of GB-A-2 038 597, quite a number of types of movement, for example jumps, have to be input manually, for example by pressing a button, which affects the impression of virtual reality.

SUMMARY OF THE INVENTION

The invention provides a device of the type initially mentioned which enables the user's impression of virtual reality to be reinforced.

The invention provides for a device of which has a support surface mounted on a base part such that it can also rotate about a substantially vertical axis or/and move in the direction of a substantially vertical axis, and that a sensor device is also formed to detect the direction and the magnitude of a rotational movement of the body of the user about the substantially vertical axis and/or to detect at least the magnitude of a vertical movement of the body's center of gravity, as well as to generate corresponding sensor signals. The unit according to the invention, is called "CYBERSURFER" by the applicants, and enables not just shifts of the body weight of the user to be detected and used to control locomotion in virtual space, but also rotational and vertical movements of the user. This is of particular interest in connection with computer games in which it is possible to simulate branches of sports such as surfing, snowboarding or skate-boarding or in which the virtual body of the user has to jump over virtual obstacles such as streams, gorges, etc. or climb rock faces, etc.

The user generally stands on the CYBERSURFER, so that he does not in fact have to move from a spot in real space in order to control his locomotion in virtual space. This is important in so far as—because he takes in his entire field of vision through the cyber-helmet—the user is blind to his real environment and therefore could not move safely in the latter. However the device according to the invention can in effect reinforce the user's impression of virtual reality without endangering his safety in the process.

The support surface may, for example, be provided at a standing plate, preferably of relatively large dimensions, of the support unit of the bearing device. However it is also possible to provide two relatively small rest surfaces, disposed at a common connecting tube or similar device for supporting the user's two feet. The provision of a relatively large support surface is advantageous in so far as it can also be used to sit or kneel on.

The support part is formed by the standing plate, the rest surfaces-connecting tube unit or similar device can be connected to an intermediate part, which is disposed between the base part and the support part, such that it tilts with this intermediate part, yet it is also allowed to turn relative to it. The intermediate part is in this case is preferably connected to a base part in a rotationally rigid manner.

The support unit may be mounted with the base part such that it can tilt and rotate about the substantially vertical axis by a ball-and-socket joint. The ball-and-socket joint can in this case be provided at a tubular section which is telescopically guided at a further tubular section secured to the base part. Such a design allows for four degrees of freedom of movement which can be detected according to the invention. Moreover, this freedom of movement is achieved with a simple and yet mechanically rugged construction.

The sensor device can be protected against unintentional damage by being disposed at least partly in a holding space defined by the tubular section, the further tubular section and the base part. Another possible way to protect the sensor device lies in disposing it in a protective housing which is formed and dimensioned such that it strikes against the tubular section and/or the further tubular section before the sensor device is deformed to excess. A further advantage in this case lies in the fact that the sensor device is disposed in the extension of the rotational axis, so that a rotational movement of the user can be detected undistorted, i.e. also as a turning movement of the sensor device, which facilitates subsequent interpretation of the detection signals.

The sensor device may, for example, be constructed and disposed at the CYBERSURFER such that a first part of the sensor device is secured to the base part and a second part of the sensor device is connected to a part of the ball-and-socket joint which is fixed to the support unit so as to tilt and rotate with it and, when the part of the ball-and-socket joint which is fixed to the support unit moves downwards relative to the second part of the sensor device, can be brought into pulling engagement with this. It is thus possible to use any suitable type of sensor device with the CYBERSURFER according to the invention, for example sensor devices comprising potentiometers, strain gauges, etc. However, with regard to a low susceptibility to wear, the invention proposes that at least one of the sensor devices be an optoelectronic sensor device, as is used, for example, in the SPACE MOUSE (trademark).

In order to make it easier for the user to keep his balance on the CYBERSURFER and also to be able to limit the maximum angle of tilt of the support plate to a relatively small value of, for example, 10° to 15°, the provision of a restoring device which opposes tilting of the support surface is proposed. This restoring device may be provided at a low cost if is comprises at least one compressible element, preferably at least one element filled with a compressible medium, for example a pressure hose. The compressible element may act on the intermediate part, for example.

It may also be advantageous with respect to the rotational mounting arrangement to provide a restoring device which opposes a turning movement of the support surface, which device can be provided simply and at a low cost by including at least one elastic, preferably elastomeric or spring-elastic element which is articulated at one end to the support plate and at the other to the intermediate part.

If the support surface undergoes a rotational deflection due to the upper part of the user's body rotating relative to his legs, i.e. a movement as is executed, for example, when the walking direction is to be changed, the rotational restoring device ensures that the support surface and thus also the body of the user is returned to an initial rotational position. A friction or damping device may additionally be associated with the rotational mounting arrangement to prevent this return movement from taking place too quickly and preferably make it imperceptible, or almost so, to the user.

This return to the initial rotational position is also important with regard to the safety of the user standing on the CYPERSURFER, as the latter can always be sure of retaining substantially the same relative orientation in real space. If, for example, handles or similar are disposed at the user's side, the latter knows that, should he accidentally lose his balance, he only need reach beside him to regain his balance with the aid of the handles. He can therefore be sure that the handles are at his side and not, for example, in front of or behind him.

It is also possible to provide a vertical restoring device which opposes a vertical movement of the support surface, especially in case the direction of a vertical movement of the user is also to be detected. This device may include at least one compressible element, for example. If at least one element filled with a compressible medium, for example a compressed-air hose, is used, this may at the same time adopt the tilting and vertical restoring position. If it is only the detection of the magnitude of a vertical movement of the user which is of interest, the restoring action can be accomplished by the weight of the user himself after the support surface has been relieved of the load.

In order to enable the CYBERSURFER according to the invention to be adapted to being used by both a child and an adult, it is proposed that the restoring force of at least one of the restoring devices be variable. As the forces or torques which a child can exert on the support surface of the CYBERSURFER are usually considerably smaller, it should be possible to reduce the restoring forces accordingly when the CYBERSURFER is used by a child.

If the restoring device includes an element filled with a compressible medium, for example a gas-filled hose, the restoring force can be increased or reduced by raising or lowering the gas pressure in the hose. However if the restoring device includes elastic elements, e.g. helical tension springs, a variable restoring force can be achieved by forming one of the articulation points of the—at least one—elastic element at a slide which can be displaced on a screw spindle, the screw spindle being rotatably retained at the respective element, support surface or bearing part.

In order to be able to offer the user a relatively stable initial support surface position, from which the support surface is not deflected each time the user shifts his weight slightly (with a corresponding result for the movement of the virtual body in virtual space), it is proposed that a detent device be provided which only allows the support surface to tilt out of an initial position upon a tilting moment which exceeds a predetermined tilting moment being exerted on this support surface. A detent device which only allows the support surface to turn upon a torque which exceeds a predetermined torque being exerted on this support surface may also be associated with the rotational bearing. Finally, it is of advantage also to provide a vertical detent device which only allows the support surface to execute a vertical movement upon an impulse which exceeds a predetermined impulse being exerted on this support surface.

At least one of the above-mentioned detent devices may include a detent pin at the support unit or the base part, as well as an associated detent depression at the base part or support unit, the detent pin preferably being preloaded by a spring into the detent depression. If at least three detent pins are provided which each co-operate with a detent depression extending in a substantially vertical direction over a predetermined length or with a detent point, these may undertake both the tilt locking action and the rotational locking action and, when using detent points instead of elongate detent depressions, even the vertical locking action. The preloading force for the locking action may of course be adjustable.

Both with regard to the safety of the user and with regard to protecting the CYBERSURFER, and in particular its sensor device, against damage, in a development of the invention, it is proposed that an angle of tilt limiting device and/or a rotational angle limiting device and/or a vertical movement limiting device be provided, each of these limiting devices including at least one stop surface and at least one associated mating stop surface.

It is also proposed that the initial position of the bearing device relative to the foundation be variable or adjustable. It is thereby possible, for example, to prevent a user who is standing on the bearing device from feeling as though he were walking down a slope if the support surface tilts, as is required to bring about a forward movement at a pleasant speed in virtual space.

In order to be able to increase the user's stability on the support surface, particularly with regard to his safety, it is proposed that the support surface comprise a non-slip surface coating. At least one retaining loop or tie for a foot of the user may be provided on the support surface as an additional or alternative measure.

For certain applications it may be of advantage for the CYBERSURFER according to the invention to comprise at least one connection for a further device for detecting movements of the user, for example for a cyber-glove, and/or at least one connection for a visual and/or acoustic output unit. Possible visual output units, apart from a cyber-helmet, are monitors and projection devices, for example large-area laser projectors. Both groups of features, which can be used together or alternatively, help to augment the impression of virtual reality.

With a view to the possibility of using the CYBERSURFER according to the invention for as many purposes as possible, it is also proposed that a standardized interface for a data processing system, for example a standardized serial or parallel interface, be associated with at least one of the connections, which interface may also be a standardized, so-called game port.

According to a further aspect, the invention relates to a method for controlling the movement of a body virtually present in a data processing system in a correspondingly virtual space on the basis of the states of movement of the real body of a user which are detected by a device according to the invention, in which method according to the invention different movement parameters of the virtual body are controlled on the basis of the detected sensor signals.

These sensor signals or the underlying movements/states of movement of the real body of the user in real space may be used in different ways to control the movement of the body in virtual space.

For example, the direction of a translatory movement of the virtual body may be controlled on the basis of the detected direction of a shift of the center of gravity of the real body of the user, and the speed of a translatory movement of the virtual body controlled on the basis of the magnitude of the shift of the center of gravity of the real body of the user. Given this interpretation of the sensor signals, the shift of the body weight is therefore used solely to control a purely translatory movement of the body in virtual space.

Alternatively, the radius of curve of a circular movement of the virtual body may be controlled on the basis of the detected direction of a shift of the center of gravity of the real body of the user, and the speed of the movement of the virtual body controlled on the basis of the magnitude of the shift of the center of gravity of the real body of the user. This form of interpretation may be used, for example, to simulate a motorcycle race or similar.

Instead of controlling the speed on the basis of the magnitude of the shift of the center of gravity, the acceleration of the movement of the virtual body could alternatively also be controlled on the basis of the magnitude of the shift of the center of gravity of the real body of the user.

According to a "1:1" interpretation the direction of a tilting movement of the virtual body can be controlled on the basis of the detected direction of a shift of the center of gravity of the real body of the user, and the magnitude of the tilting movement of the virtual body controlled on the basis of the magnitude of the shift of the center of gravity of the real body of the user. This interpretation is of advantage, for example, when simulating surf-riding or surfing. The above-mentioned safety handles may perform an additional function when the sensor signals are thus interpreted. For when simulating wind-surfing, the user can grip the handle as a simulation of the trapeze of the wind-surf sail. When simulating surf-riding, snowboarding or similar, the user can take up an inclined position, as would be required in reality to balance the dynamic forces occurring, with the aid of the handle.

According to another interpretation the speed or the acceleration of a movement of the virtual body can be controlled on the basis of the magnitude of a forward shift, determined from the direction and magnitude of the shift of the center of gravity, of the real body of the user, and the radius of curve of a circular movement of the virtual body controlled on the basis of the magnitude of a lateral shift, determined from the direction and magnitude of the shift of the center of gravity, of the real body of the user.

It is also possible to control a rotation of the virtual body about its transverse axis on the basis of the magnitude of a forward shift, determined from the direction and magnitude of the shift of the center of gravity, of the real body of the user, and control a rotation of the virtual body about its longitudinal axis or/and vertical axis on the basis of the magnitude of a lateral shift, determined from the direction and magnitude of the shift of the center of gravity, of the real body of the user.

The above-mentioned various interpretation possibilities for the movement of the support surface, resulting from a shift of the body weight of the user, may also include the control of the direction and magnitude of a rotation of the virtual body about its vertical axis on the basis of the detected direction or the detected magnitude of a rotational movement of the real body of the user or/and the control of the direction and magnitude of a movement of the virtual body in the direction of its vertical axis on the basis of the detected direction or the detected magnitude of the impulse transmission as a result of a vertical movement of the real body of the user.

The invention also provides for a method of simulating an activity of a user which includes at least partially supporting the user on a support surface of a support plate which is rotatable relative to a base structure, detecting movements of the support plate by way of a sensor device mounted to the base structure, resisting rotational movement of the support plate relative to an intermediate plate by way of an adjustable rotation biasing device disposed between the support plate and the intermediate plate, resisting a tilting of the support plate by way of a detent device, resisting tilting of the support plate by way of an adjustable tilt restoring device disposed between the base structure and the intermediate plate, and placing the user on the support surface, wherein the support part is rotatable and tiltable about an axis when the user is placed on the support surface.

Although the device according to the invention and the method according to the invention were illustrated above on the basis of the control of the locomotion of the virtual body of the user in virtual space, the virtual body may of course also be any other virtual object, for example an object which is designed by means of a CAD program and the position of which in virtual space is to be varied.

Other exemplary embodiments and advantages of the present invention may be ascertained by reviewing the present disclosure and the accompanying drawing.

BRIEF DESCRIPTION OF THE DRAWINGS

The invention is explained in detail in the following on the basis of an embodiment and in the light of the accompanying drawings, in which:

FIG. 5 is an enlarged representation of the edge region of the base cradle of the CYBERSURFER according to the invention to illustrate alternative locking and movement limiting devices.

DETAILED DESCRIPTION OF THE PRESENT INVENTION

Figure 1:
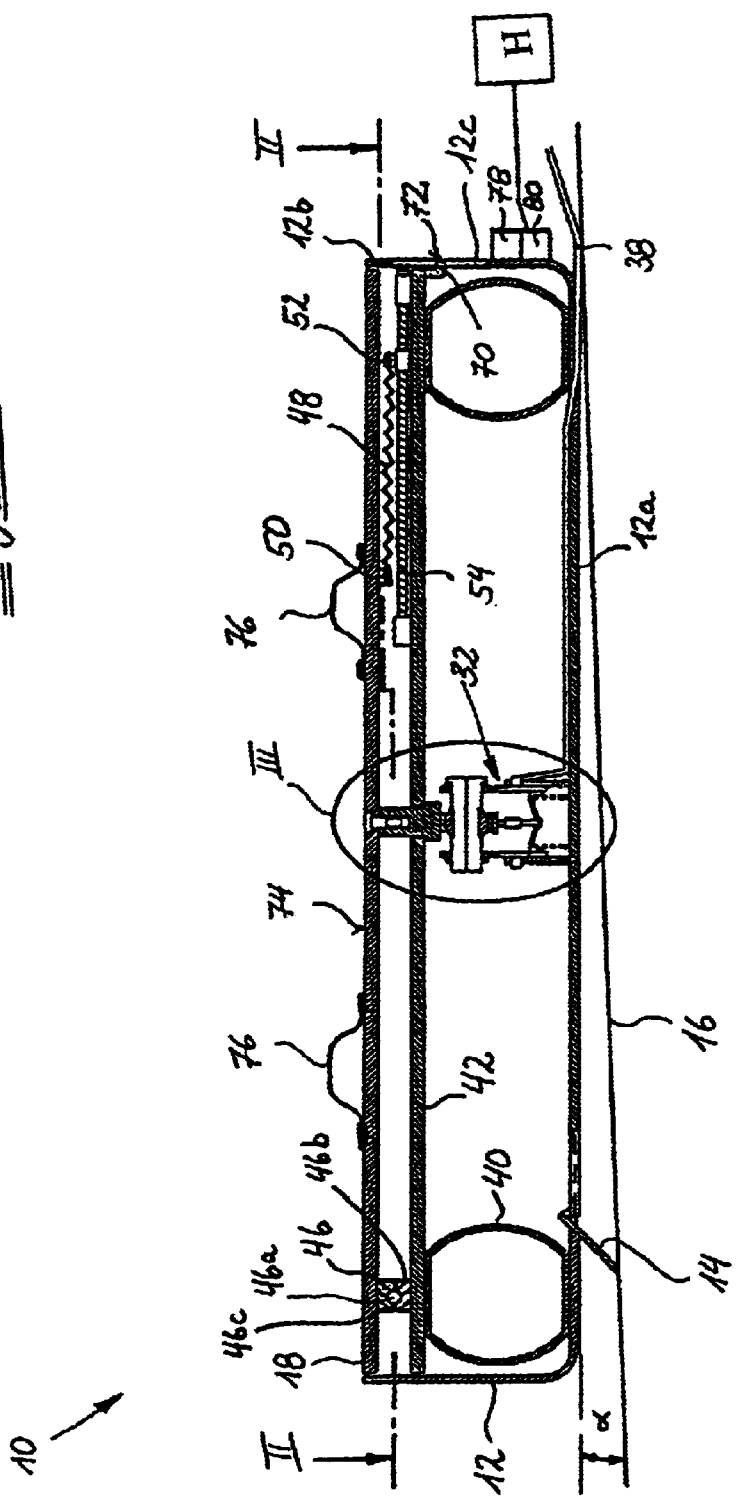
FIG. 1 is a sectional view of the CYBERSURFER according to the invention.

The device according to the invention for detecting certain states of movement of the body of a user is generally designated by 10 in FIG. 1. It comprises a base cradle 12 with a base plate 12a and a circumferential edge adjoining the base plate 12a. The device 10 (also called CYBERSURFER 10 in short in the following) is mounted on the foundation 16, for example a floor of a room, by a swing-out or, in the representation according to FIG. 1, swung-out foot 14. A standing plate 18 is mounted in the base cradle 12.

A pivot pin 22 is secured to the standing plate 18, for example by a screw bolt 20 (see FIG. 3), at the free end of which pin a joint ball 24 is disposed. The joint ball 24 is held in a bearing shell formed by two bearing shell halves 26. The two bearing shell halves 26 are firmly connected together and to a tubular section 28, which is telescopically guided in a further tubular section 30 secured to the base plate 12.

The mounting arrangement illustrated above enables the standing plate 18 to be tilted relative to the base plate or base cradle 12 about two (disregarding the angle of inclination α due to the standing foot 14) directions in space X and Y extending substantially horizontally and orthogonally to one another, rotated about a space axis Z extending substantially vertically and orthogonally to the two directions in space X and Y and moved in translatory fashion in the direction of the space axis Z.

The above-mentioned movements of the standing plate 18 are detected by an optoelectronic sensor unit 32 includes a light source 34, which is connected to the joint ball 24, and a plurality of photodetectors 36, which are disposed at the circumference of the tubular section 30. In order for the light to pass from the light source 34 to the photodetectors 36, openings 28a are provided at locations corresponding to the photosensors 36 in the circumference of the tubular section 28, which is guided telescopically, yet such that it cannot turn about the vertical axis Z, in the tubular section 30. The light source 34 emits a plurality of light beams of a predetermined characteristic which are detected by the photodetectors 36.

The term "light source" is in this connection also to be understood as a reflector or scattering arrangement which deflects as secondary light the light irradiated from a primary external light source and conducts it to the photosensors 36. The term "light" is also not to be understood as restrictive in the optical sense; it may also be used for electromagnetic waves which are invisible to the human eye, for example infrared radiation.

The sensor signals which are detected by the photosensors 36 and correspond to the state of movement of the standing plate 18 relative to the base cradle 12 are transmitted via a signal line 38 to a data processing system DP. The optoelectronic sensor device 32 may, for example, comprise a sensor mechanism similar to that used in the SPACE MOUSE (trademark).

Figure 2:
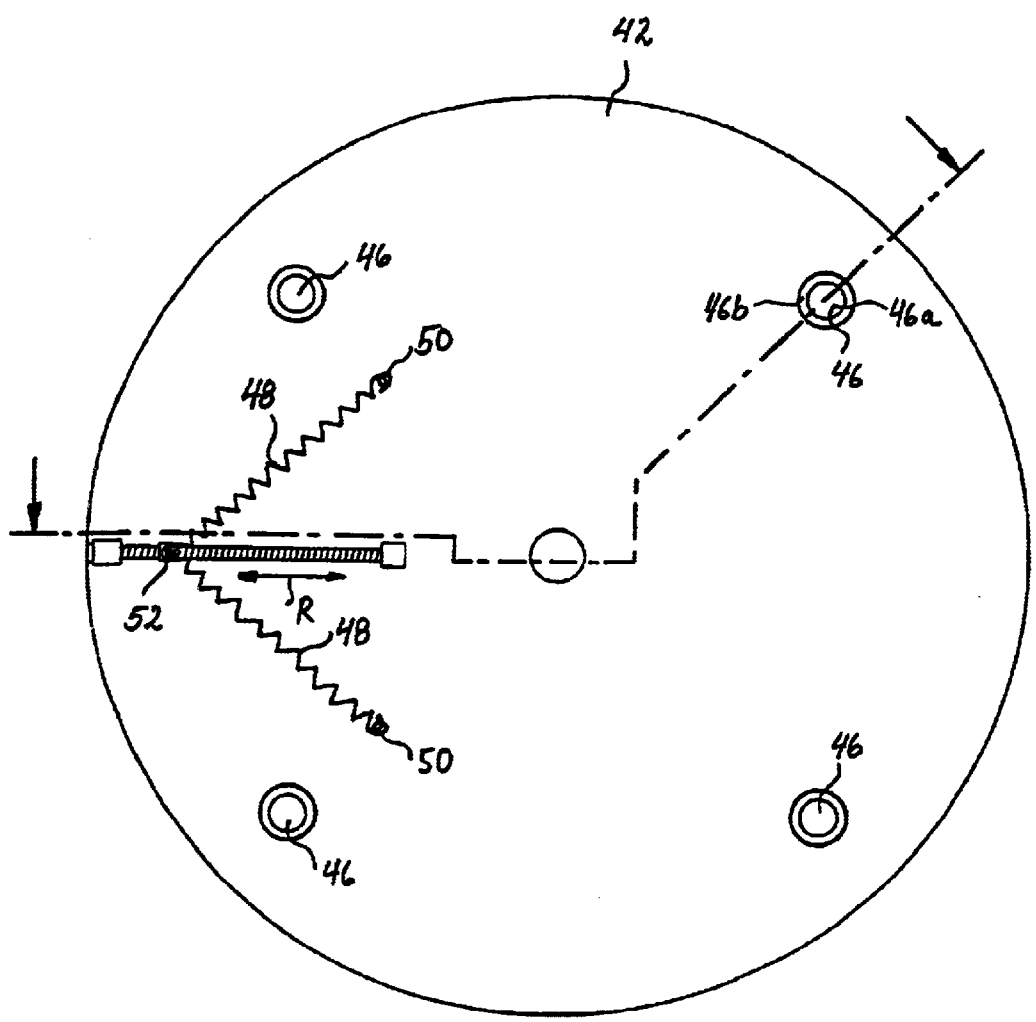
FIG. 2 is a plan view onto the intermediate plate, the support plate having been removed, according to the line II—II in FIG. 1.

The CYBERSURFER 10 according to the invention also includes restoring devices which oppose a deflection of the standing plate 18 according to one of the degrees of freedom of movement illustrated above from the initial position represented in FIG. 1. Thus, for example, according to FIG. 1 a hose 40 is provided which is filled with compressed air and opposes both a tilting movement of the standing plate 18 about the ball-and-socket joint 24/26 and an inward movement of the standing plate 18 in the vertical direction Z into the base cradle 12. The hose 40 is supported on the one hand at the base cradle 12 and on the other at an intermediate plate 42, which is retained via a rotational bearing 44 of the pivot pin 22 and ball bearings 46 (see also FIG. 2) such that it tilts with the standing plate 18, yet can turn relative to the latter about the axis of the pivot pin 22. The ball bearings 46 comprise bearing balls 46a, which are retained on the side of the intermediate plate 42 in bushings 46b and guided on the side of the standing plate 18 in tracks 46c, these tracks extending over an angle of approximately 10° to 15°, related to the axis A of the pivot pin 22.

The restoring device which opposes a turning movement of the standing plate 18 about the axis A of the pivot pin 22 is in the form of elastic elements 48, for example rubber bands or helical tension springs, which are articulated at one end at 50 to the standing plate 18 and at the other to a slide 52, which can be displaced in the radial direction R (see FIG. 2) on a screw spindle 54 connected to the intermediate plate 42. The screw spindle 54 can be rotated through an opening 12c provided in a side wall 12b of the base cradle 12 by a tool, which is not represented, in order thus to vary the preloading of the elastic elements 48 and accordingly their restoring force on the standing plate 18.

A detent device is also provided for each of the degrees of freedom of movement, as illustrated above, of the standing plate 18, which device makes it necessary to overcome a certain initial resistance in order to actually deflect the standing plate from the initial position according to FIG. 1.

Figure 3:
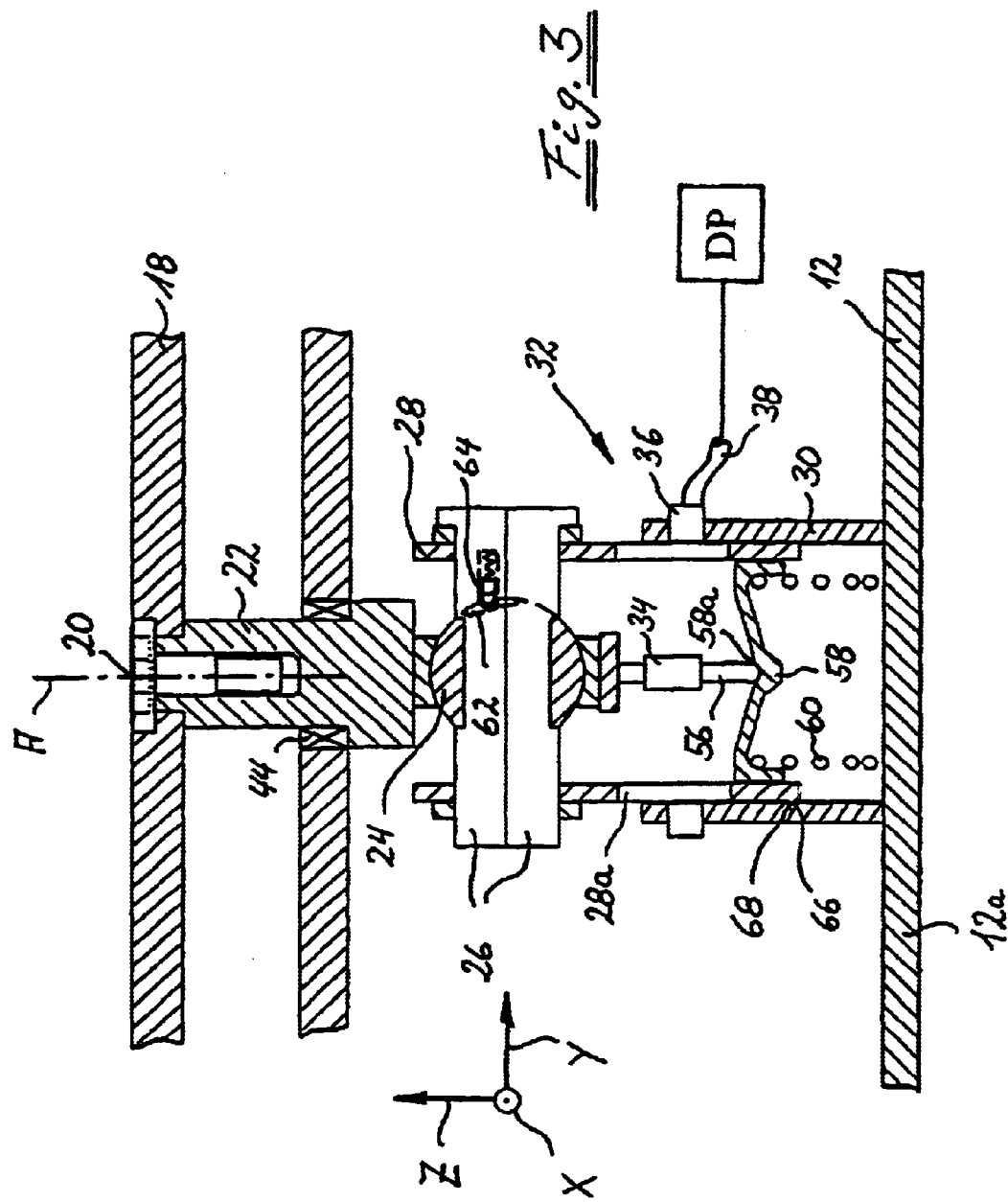
FIG. 3 is an enlarged representation of the detail III in FIG. 1.

The detent device which initially opposes tilting includes a detent pin 56 (see FIG. 3) which is connected to the joint ball 24 and engages in the detent recess 58a of a mating element 58 in the initial position according to FIG. 1 or FIG. 3. The mating element 58 is shaped like a hopper in the vicinity of the detent recess 58a, is guided at its outer circumferential edge in the tubular section 28 and preloaded towards the detent pin 56 by a spring 60 supported at the base plate 12a. The detent pin 56 is automatically returned to the detent depression 58a when there is no load on the support surface 74 by the spring preloading. The latter also ensures that the detent pin 56 is returned to the detent depression 58a when the restoring device would still allow a slight deflection of the detent pin 56 from the detent depression 58a in the absence of a load on the support surface 74.

The detent device which opposes a rotational movement of the standing plate 18 about the axis A of the pivot pin 22 comprises a detent groove 62, which is formed in the joint ball 24, and a detent body 64, which is preloaded by a spring and guided in one of the bearing shell halves 26. It is to be noted that the detent recess 62 is not simply provided as a depression which is formed so as to be complementary to the engagement section of the detent body 64, but as an elongate detent groove which allows the standing plate 18 to tilt without the detent body 64 being disengaged from the detent groove 62 at the same time.

The detent device which initially opposes a vertical displacement of the standing plate 18 comprises a detent lug 66 which is associated with the tubular section 28 and engages in a detent notch 68 formed in the tubular section 30. If the materials of which the tubular sections 28, 30 are formed are not sufficiently flexible, the detent lug 66 at the tubular section 28 may also be preloaded by a spring.

According to FIG. 1 an indicating element 70 is disposed at the intermediate plate 42, this element being visible through the elongate opening 12c in the side wall 12b of the base cradle 12. A marking 72, which may be formed as a single line or as a scale comprising a plurality of lines, is provided in the region of the edge of the opening 12c. The purpose of this indicating device 70/72 is to facilitate adaptation of the CYBERSURFER 10 to the respective weight of the user by inflating the hose 40 or letting air out of the hose 40. If the indicating element 70 and the marking 72 coincide, the user may assume that, inter alia, the detent device 66/68 is also in the desired position.

The support surface 74 of the standing plate 18 is provided with a non-slip surface coating and/or a non-slip surface structure. Loops 76 for the user's feet are also provided on the standing plate 18.

FIG. 1 also shows in a roughly diagrammatic form a connection 78 for a further input unit, for example a joystick, a cyber-glove or similar, as well as a connection 80 for a unit for the visual and/or acoustic indication of data, for example a cyber-helmet H. However the visual/acoustic indication may also take place via a conventional visual display unit directly connected to the data processing system.

It should also be added that the swing-out standing foot 14 is intended for inclining the CYBERSURFER 10 such that the user does not feel as though he were walking down a slope if the standing plate 18 were to tilt, as is required to bring about a forward movement at a pleasant speed in virtual space.

A further point to be added is that a rail is disposed around the user, a cage or similar type device may also be provided instead of the handles to safeguard the user (these are not shown).

A further point to be added is that the data transmission between the unit according to the invention and the data processing system may also take place via a contactless data communication link employing infrared signals, for example.

The bearing device with a tiltable and/or vertically mobile and/or rotatable standing plate could also be replaced by a standing plate provided with a plurality of pressure sensors, in which case the movements executed by the user are determined through appropriate correlation of the measurement signals of these pressure sensors.

Figure 4:
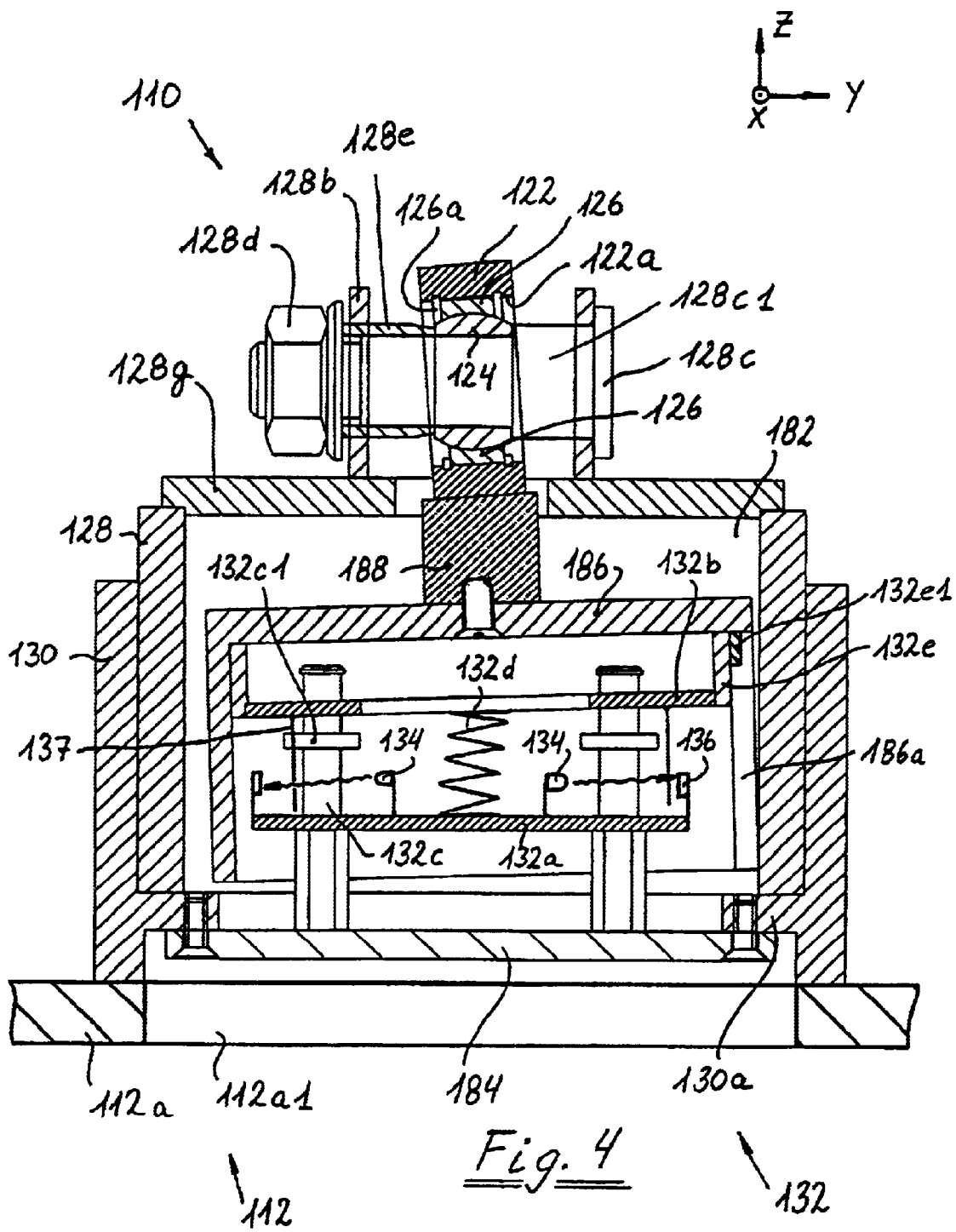
FIG. 4 is a view similar to FIG. 3 of the bearing/sensor unit of a modified embodiment.

FIG. 4 shows the bearing and sensor subassembly of an alternative embodiment of the CYBERSURFER according to the invention in a representation which is analogous to FIG. 3. The bearing-sensor subassembly according to FIG. 4 corresponds substantially to that according to FIG. 3. Analogous parts have therefore been given the same reference numbers in FIG. 4 as in FIG. 3, although increased by 100. Moreover, the bearing-sensor subassembly according to FIG. 4 is only described in the following in so far as it differs from that according to FIG. 3.

In the embodiment according to FIG. 4 the pivot pin 122 comprises at its lower end a hole 122a, in which two joint ball bearing shell halves 126 are held and retained by retaining rings 126a. Two fixing projections 128b are disposed on a cover section 128g of the tubular section 128, to which projections a screw bolt 128c is secured by a nut 128d. The bolt 128c passes through a hole in the joint ball 124, which is supported by way of its end which is on the right in FIG. 4 at a collar 128c1 of the fixing bolt 128c and is engaged at its end which is on the left in FIG. 4 with a clamping sleeve 128e, which is clamped in engagement with the joint ball 124 by the nut 128d. It is thus possible, using parts which can be easily manufactured and therefore obtained at a low cost, to provide a structurally simple, yet rugged ball-and-socket joint for mounting the support unit.

The tubular section 128 is mounted so as to be telescopically displaceable in the vertical direction Z in a further tubular section 130, which is secured to the base plate 112a, and stands on a radially inner annular projection 130a of the further tubular section 130 in the position represented in FIG. 4, which corresponds to the preferred initial position of the CYBERSURFER 110 according to the invention. The base plate 112a, the tubular sections 130 and 128 as well as the cover 128g of the tubular section 128 together form a holding space 182 for the sensor unit 132, which is accessible through an opening 112a1 in the base plate 112a.

The sensor unit 132 formed like the SPACE MOUSE (trademark), which has already been mentioned several times, comprises a stationary plate 132a, which is secured via a support arrangement 184 to the annular projection 130a and therefore to the base plate 112a, and a plate 132b, which can move relative to the plate 132a. A plurality of light sources 134 and a plurality of photodetectors 136 are mounted on the stationary plate 132a, while a plurality of screen elements 137 are in each case disposed at the mobile plate 132b between a light source 134 and a photodetector 136. The mobile plate 132b is guided relative to the stationary plate 132a by guide elements 132c. Stop shoulders 132c1 of the guide elements 132c ensure that a minimum distance is maintained between the two plates 132a and 132b. The mobile plate 132b and the stationary plate 132a are in addition connected together by springs 132d, which preload the two plates 132a and 132b into a predetermined initial position relative to one another.

A tubular section 132e, which is held in a pot-shaped protective housing 186, is secured to the outer circumference of the mobile plate 132b. The protective housing 186 is connected to the pivot pin 122 and transmits the tilting and rotational movements of the latter to the tubular projection 132e. The protective housing 186 also transmits downward movements of the pivot pin 122 to the tubular projection 132e and therefore the mobile plate 132b of the sensor unit 132, in any case until the tubular section 128 stands on the annular projection 130a.

In order to protect the sensor unit 132 against excessive approximation of the two plates 132a and 132b, the entire arrangement is dimensioned such that the tubular section 128 and the annular projection 130a strike against one another before the mobile plate 132b engages with one of the stop collars 132c1. In order to protect the sensor unit 132 against excessive distancing of the two plates 132a and 132b from one another, the tubular section 132e is mounted in the protective housing 186 such that it can be displaced in the vertical direction by vertical grooves 186a in the protective housing and guide lugs 132e1 of the tubular section 132e. Moreover, the contact, indicated on the right-hand side of FIG. 4, between the protective housing 186 and the tubular projection 128 ensures that the sensor unit 132 cannot be exposed to excessive lateral deformation. As a further safeguard in this respect, the protective housing 186 may be connected to the pivot pin 122 via an elastomeric element 188, which prevents deforming damage to the overall arrangement both after a possible engagement of the protective housing 186 with the tubular section 128 and as a result of excessive turning of the two plates 132a and 132b. In addition, in co-operation with the springs 132d, the elastomeric element 188 enables the movement of the standing plate 118 to be reduced to a corresponding movement of the mobile plate 132b of the sensor unit 132.

It remains to be added that the springs 132d are compressed slightly when the tubular section 128 is standing on the annular projection 130a in order, if the user jumps and the pivot pin 122 and the protective housing 186 consequently move upwards under the action of the pressure hoses 40, to be able to move the mobile plate 132b away from the stationary plate 132a to detect the jumping movement of the user.

In order that both children and adults may easily use the CYBERSURFER according to the invention, the bearing device can be adapted to the weight of the user in question. This adaptation may take place as follows in an exemplary embodiment of the invention: With the user standing on the support surface 174 (see FIG. 5), air is let out of the compressed-air hose 40, on which the support unit 118/142 rests, until the tubular section 128 connected to the ball-and-socket joint is standing on the annular projection 132a.

In order also to be able to detect the direction of a vertical movement of the user, according to a modified embodiment it is possible for the tubular section 128 not to stand on the annular projection 130a when the CYBERSURFER is in the initial position. In order that an adaptation to the weight of the user in question may still be carried out, an adjustment indication as described above with reference to FIG. 1 may be provided. This point of the text refers to the adjustment indication 70 and the adjustment marking 72.

According to FIG. 5 an angle element 190 is secured to the outer circumferential edge of the standing plate 118, at the leg 190a, extending downwards in FIG. 5, of which element a detent element 192 with a detent pin 192a is disposed. As indicated in rough diagrammatic fashion in FIG. 5, the detent pin 192a is preloaded by a spring and presses against the inner surface of the base cradle edge 112b. An associated detent groove 192b, which extends substantially in the vertical direction, is made in the upper end of the inner circumference of the base cradle edge 112b. The arrangement of the detent element 192 at the angle 190 and the position of the lower end of the detent groove 192b are adapted to one another such that the detent pin 192a lies directly against the lower end edge 192b 1 of the detent groove 192b when the standing plate 118 is substantially horizontal. The resistance of the preloading spring 192c therefore has to be overcome when the standing plate 118 is to be tilted into the position represented in FIG. 5, while the detent pin 192a can slide substantially without resistance in the detent groove 192b when an upward movement is executed due to the standing plate 118 tilting.

If at least three, preferably at least four detent elements 192 of this kind are distributed over the circumference of the cradle edge 112b, together these form a detent device which secures the standing plate 118 both against tilting about a substantially horizontal tilting axis and against turning about the substantially vertical axis. If the rotational locking action is to be dispensed with, the dimensions of the detent groove 192b would have to be significantly greater than the corresponding dimensions of the detent pin 192. If, on the other hand, there is to be no tilt locking action, the lower end 192b1 of the detent groove 192b would have to be disposed substantially closer to the base plate 112a. If the detent device is also to be effective with regard to vertical movements of the standing plate 118, the upper end 192b2 would have to be brought so near to the lower end 192b1 of the detent groove 192b that the latter would be reduced to a detent point.

FIG. 5 also shows a stop element 194 which optionally co-operates with the intermediate plate 142 so as to prevent excessive tilting of the entire support unit. Angle elements 196 may additionally or alternatively be disposed at the intermediate plate 142, to which elements stop elements 198 are in turn secured, these stop elements 198 passing through openings 199 in the cradle edge 112b and, together with these, limiting the angle of tilt. The stop device 198/199 also ensures that the tubular section 132e and the protective housing 186 cannot be disengaged by mistake upon the user jumping and that the intermediate part 142 does not turn unintentionally relative to the base part 112.

Stop elements 191 are provided at the standing plate 118 and mating stop elements 193, which co-operate with the stop elements 191, at the intermediate plate 142 in order to form a rotational angle limit. The fact that the tubular section 128 and the annular projection 130a together form a vertical limiting device has already been pointed out. FIG. 5 also shows a weight 197, which is secured to the base plate 112a in order to improve the stability of the entire CYBER-SURFER 110.

It should also be added that if the angle of tilt limit 194 or 198/199 is appropriately dimensioned so as to prevent contact between the protective housing 186 and the tubular section 128, or if the circumferential wall of the protective housing 186 is made of a flexible material, the pivot pin 122 and the protective housing 186 may also be rigidly connected together via the elastomer element 188 if the rotational angle limit 191/193 is designed accordingly.

A further point to be added is that the preloading force of the detent spring 192c may be adjustable.

What is claimed:

1. A device for detecting certain states of movement of a body of a user and for generating signals corresponding to a result of a detection for subsequent processing in a data processing system, comprising:
    a bearing device for supporting the body of the user;
    said bearing device further comprising a support unit mounted in a tiltable manner on a base part;
    said support unit comprising a standing part;
    said standing part having a support surface for supporting the body of the user; and
    a sensor device for detecting a direction and a magnitude of a position of a projection of the body's center of gravity into the support surface relative to a predetermined original position in the support surface,
    wherein the direction and the magnitude of the tilt of the support surface are detected for generating corresponding sensor signals,
    wherein the support surface is mounted on the base part of said bearing device such that it can either rotate about an axis or move in a direction which is parallel to said axis, said axis being one of:
        vertically oriented when the support surface is oriented horizontally,
        perpendicular to at least the support surface,
        running through at least the base part and the support surface when the support surface is not tilted,
        running through at least the support surface and a tiltable mounting, or
        running through at least the base part and a tiltable mounting,
    wherein the sensor device detects either the direction and the magnitude of a rotational movement of the body of the user about the axis or detects at least the magnitude of a vertical movement of the body's center of gravity, and generates corresponding sensor signals.

2. The device of claim 1, wherein the support unit further comprises an intermediate part disposed between the support part and the base part,
    wherein the intermediate part is connected to the support part such that the intermediate part tilts with the support part and such that the support part rotates relative to the intermediate part, and
    wherein the intermediate part is connected to the base part in a rotationally rigid manner.

3. The device of claim 1, wherein the support unit is connected to the base part such that it can tilt and rotate about said axis, the axis being a substantially vertical axis, the support unit being connected to the base part by a ball-and-socket joint.

4. The device of claim 3, wherein the ball-and-socket joint is disposed on a tubular section which is telescopically guided with respect to a further tubular section, said further tubular section being secured to the base part.

5. The device of claim 4, wherein the sensor device is disposed at least partly in a holding space defined by the tubular section, the further tubular section and the base part.

6. The device of claim 5, wherein the sensor device is disposed in a protective housing, said sensor device including a stop that strikes against one of the tubular section and the further tubular section before the sensor device is deformed to excess.

7. The device of claim 3, wherein the sensor device comprises a first part and a second part, the first part being secured to the base part and the second part being connected to the ball-and-socket joint which is fixed to the support unit so as to tilt and rotate with it, and
    wherein the ball-and-socket joint is moveable relative to the second part.

8. The device of claim 1, further comprising a tilt restoring device for opposing a tilting of the support surface.

9. The device of claim 8, wherein the tilt restoring device comprises at least one compressible element, the at least one compressible element being filled with a compressible medium.

10. The device of claim 1, further comprising a rotational restoring device for opposing a turning movement of the support surface.

11. The device of claim 10, wherein the rotational restoring device comprises at least one of elastic and spring-elastic element which is articulated at one end to the support part and at another end articulated to an intermediate part,
    wherein one of the articulation ends connects to a slide which can be displaced via a screw spindle.

12. The device of claim 1, further comprising a restoring device for opposing a vertical movement of the support surface.

13. The device of claim 12, wherein the vertical restoring device comprises at least one compressible element, the at least one element being filled with a compressible medium.

14. The device of claim 12, wherein the restoring device is variable.

15. The device of claim 1, further comprising a tilt detent device for allowing the support surface to tilt from of an initial position when a tilting moment is exerted which exceeds a predetermined tilting moment being exerted on the support surface.

16. The device of claim 1, further comprising a rotational detent device for allowing the support surface to turn when a torque is exerted which exceeds a predetermined torque being exerted on the support surface.

17. The device of claim 1, further comprising a vertical detent device for allowing the support surface to move vertically when an impulse is exerted which exceeds a predetermined impulse being exerted on the support surface.

18. The device of claim 15, wherein the detent device comprises a detent pin connected to one of the support unit and the base part, wherein the bearing device further comprises a detent depression and wherein the detent pin is preloaded by a spring into the detent depression.

19. The device of claim 18, wherein the detent device comprises at least three detent pins which each co-operate with a corresponding detent depression wherein each depression extends in a substantially vertical direction over a predetermined length.

20. The device of claim 1, further comprising one of a tilt limiting device, a rotational angle limiting device and a vertical movement limiting device.

21. The device of claim 1, wherein the bearing device is variably moveable from an initial position relative to a foundation.

22. The device of claim 1, wherein the support surface comprises a non-slip surface coating.

23. The device of claim 1, further comprising at least one retaining loop or tie for retaining a foot of the user on the support surface.

24. The device of claim 1, wherein the sensor device comprises an optoelectronic sensor device.

25. The device of claim 1, further comprising at least one connection for connecting a further device for detecting movements of the user.

26. The device of claim 1, further comprising at least one connection for connecting one of a visual and acoustic output unit.

27. The device of claim 25, wherein the at least one connection comprises a standardized interface for a data processing system, the standardized interface being one of a serial or parallel interface.

28. A device for simulating an activity of a user, comprising:
   a support part which is rotatable relative to a base structure, said support part comprising a support surface for at least partially supporting the user;
   a sensor device mounted to said base structure, said sensor device detecting movements of said support part;
   an intermediate part disposed between said support part and said base structure; and
   a joint connecting said support part to said sensor device, said joint defining an axis;
   said axis being one of:
      vertically oriented when the support surface is oriented horizontally,
      perpendicular to at least the support surface,
      running through at least the base structure and the support surface when the support surface is not tilted,
      running through at least the support surface and said joint, or
      running through at least the base structure and said joint,
   wherein said support part is rotatable and tiltable about said axis when the user is disposed on said support surface.

29. The device of claim 28, wherein said movements are communicated to the user in the form of visual images.

30. The device of claim 28, wherein said support part is rotatable relative to said intermediate part.

31. The device of claim 30, further comprising a restoring device for supporting said intermediate part.

32. The device of claim 28, wherein said base structure is tiltable relative to a horizontal axis.

33. The device of claim 28, further comprising a biasing device for biasing said support part against rotational movement relative to said intermediate part.

34. The device of claim 33, wherein said biasing device comprises an adjusting mechanism.

35. The device of claim 28, further comprising a bearing disposed between said support part and said intermediate part.

36. The device of claim 28, wherein said support surface comprises at least one foot retention element.

37. The device of claim 28, wherein said support surface comprises a non-slip coating.

38. The device of claim 28, further comprising at least one connection for allowing said sensor device to communicate said movements.

39. The device of claim 38, wherein said connection comprises one of a parallel or serial connection.

40. The device of claim 28, wherein said joint comprises a ball joint which allows the support to pivot in a number of directions.

41. The device of claim 40, wherein said ball joint further comprises a connecting element which connects said support device to said sensor device.

42. The device of claim 41, further comprising a bearing disposed between said connecting element and said intermediate part for allowing said connecting element to rotate relative to said intermediate part.

43. The device of claim 28, wherein said sensor device further comprises a sensor for detecting a number of movements of said joint.

44. The device of claim 43, wherein said sensor device further comprises a detent pin extending from said joint, said sensor detecting a number of movements of said detent pin.

45. The device of claim 28, wherein said sensor device further comprises a first section for connecting said joint to said base structure.

46. The device of claim 45, wherein said first section is moveable with respect to said base structure.

47. The device of claim 46, further comprising a second section, and wherein said first section and said second section are telescopically disposed.

48. The device of claim 45, further comprising a biasing device for biasing said joint to an initial non-tilting position.

49. The device of claim 48, wherein said biasing device biases a detent pin extending from said joint toward said axis.

50. The device of claim 45, further comprising a joint detent device for biasing said joint to an initial non-rotation position.

51. The device of claim 28, wherein said joint comprises a ball joint, said ball joint further comprising a ball, a ball shell, and a pin.

52. The device of claim 51, wherein said ball shell comprises at least two parts which connect said ball to a first section, and wherein said pin is pivotable with respect to said ball.

53. The device of claim 52, wherein said pin connects said support part to said sensor device.

54. The device of claim 53, where said pin connects said intermediate part to said sensor device.

55. The device of claim 28, wherein said sensor device further comprises:
   a stationary plate and a mobile plate and a device for biasing said mobile plate away from said stationary plate.

56. The device of claim 55, wherein said joint is connected to said mobile plate.

57. The device of claim 56, wherein said joint comprises a ball joint, said ball joint further comprising a ball, a ball shell, and a pin.

58. The device of claim 57, wherein said ball shell comprises at least two parts which connect said ball to a first section, and wherein said pin is pivotable with respect to said ball.

59. The device of claim 58, wherein said pin connects said support part to said sensor device.

60. The device of claim 59, where said pin connects said intermediate device to said sensor device.

61. The device of claim 60, further comprising an elastic element disposed between said pin and said mobile plate.

62. The device of claim 61, further comprising a first section for connecting said joint to said base structure, said first section being moveable with respect to said base structure.

63. The device of claim 62, further comprising a second section, and wherein said first section and said second section are telescopically disposed.

64. The device of claim 28, wherein said support part further comprises at least one stop element and wherein said intermediate part further comprises at least one mating stop element, said at least one stop element cooperating with said at least one mating stop element.

65. The device of claim 28, wherein said support part further comprises at least one detent device for resisting a tilting of said support part about said axis.

66. The device of claim 65, wherein said detent device includes a detent pin, a cooperating detent groove, and at least one stop device.

67. The device of claim 28, further comprising:
a helmet for projecting images to a user;
a data processor for receiving input signals from said sensor device;
wherein said sensor device detects movement of said user based upon movement of said support part and generates signals, said signals being manipulated by said data processor, such that the images are altered based upon movement of said support part.

68. The device of claim 67, wherein said support device is moveable in a direction parallel to said axis with respect to said base structure.

69. The device of claim 68, further comprising an adjustable tilt restoring device which resists the tilting of said support part.

70. A device for simulating an activity of a user, comprising:
a support plate which is rotatable relative to a base structure, said support plate comprising a support surface for at least partially supporting the user;
a sensor device mounted to said base structure, said sensor device detecting movements of said support plate;
an intermediate plate disposed between said support plate and said base structure;
a ball joint connecting said support plate to said sensor device, said ball joint defining an axis;
an adjustable rotation biasing device disposed between said support plate and said intermediate plate, said adjustable rotation biasing device resisting rotational movement of said support plate relative to said intermediate plate;
a first tubular section and a second tubular section disposed in telescoping relationship, said first tubular section being connected to said ball joint;
a ball joint biasing device for biasing said ball joint in a direction parallel to said axis;
a detent device disposed between said ball joint and said ball joint biasing device for resisting a tilting of said support plate;
an adjustable tilt restoring device disposed between said base structure and said intermediate plate for resisting tilting of said support plate; and
at least one bearing device disposed between said support plate and said intermediate plate,
wherein said support part is rotatable and tiltable about said axis when the user is disposed on said support surface.

71. A method of simulating an activity of a user, comprising:
at least partially supporting the user on a support surface of a support plate which is rotatable relative to a base structure about an axis;
said axis being one of:
vertically oriented when the support surface is oriented horizontally,
perpendicular to either the support surface or the base structure, or
running through at least the base structure and the support surface when the support surface is not tilted;
detecting movements of said support plate by way of a sensor device mounted to said base structure;
resisting rotational movement of said support plate relative to an intermediate plate by way of an adjustable rotation biasing device disposed between said support plate and said intermediate plate;
resisting a tilting of said support plate by way of a detent device;
resisting tilting of said support plate by way of an adjustable tilt restoring device disposed between said base structure and said intermediate plate; and
placing the user on the support surface, wherein said support part is rotatable and tiltable about an axis when the user is placed on said support surface.

72. A device for detecting certain states of movement of a body of a user and for generating signals corresponding to a result of a detection for subsequent processing in a data processing system, comprising:
a bearing device for supporting the body of the user;
said bearing device further comprising a support unit mounted in a tiltable manner on a base part;
said support unit comprising a standing part;
said standing part having a support surface for supporting the body of the user;
a sensor device for detecting a direction and a magnitude of a position of a projection of the body's center of gravity into the support surface relative to a predetermined original position of the support surface, said sensor device utilizing a point of intersection of an axis which runs through a tiltable mounting;
the direction and the magnitude of the tilt of the support surface being detected for generating corresponding sensor signals;
the support surface being mounted on the base part of said bearing device such that it can either rotate about said axis or move in a direction which is parallel to said axis;
the sensor device detecting either the direction and the magnitude of a rotational movement of the body of the user about the axis or detecting at least the magnitude of a vertical movement of the body's center of gravity, and generates corresponding sensor signals,
wherein the support unit is connected to the base part such that it can tilt and rotate about said axis, the axis being a substantially vertical axis, the support unit being connected to the base part by a ball-and-socket joint, and
wherein the ball-and-socket joint is disposed on a tubular section which is telescopically guided with respect to a further tubular section, said further tubular section being secured to the base part.

73. The device of claim 72, wherein the sensor device is disposed at least partly in a holding space defined by the tubular section, the further tubular section and the base part.

74. The device of claim 73, wherein the sensor device is disposed in a protective housing, said sensor device including a stop that strikes against one of the tubular section and the further tubular section before the sensor device is deformed to excess.

75. A device for detecting certain states of movement of a body of a user and for generating signals corresponding to a result of a detection for subsequent processing in a data processing system, comprising:

a bearing device for supporting the body of the user;

said bearing device further comprising a support unit mounted in a tiltable manner on a base part;

said support unit comprising a standing part;

said standing part having a support surface for supporting the body of the user;

a sensor device for detecting a direction and a magnitude of a position of a projection of the body's center of gravity into the support surface relative to a predetermined original position of the support surface, said sensor device utilizing a point of intersection of an axis which runs through a tiltable mounting, the direction and the magnitude of the tilt of the support surface being detected for generating corresponding sensor signals;

the support surface being mounted on the base part of said bearing device such that it can either rotate about said axis or move in a direction which is parallel to said axis;

the sensor device detecting either the direction and the magnitude of a rotational movement of the body of the user about the axis or detecting at least the magnitude of a vertical movement of the body's center of gravity, and generates corresponding sensor signals; and a rotational restoring device for opposing a turning movement of the support surface, wherein the rotational restoring device comprises at least one of elastic and spring-elastic element which is articulated at one end to the support part and at another end articulated to an intermediate part, and wherein one of the articulation ends connects to a slide which can be displaced via a screw spindle.

76. A device for simulating an activity of a user, comprising:

a support part which is rotatable relative to a base structure, said support part comprising a support surface for at least partially supporting the user;

a sensor device mounted to said base structure, said sensor device detecting movements of said support part;

an intermediate part disposed between said support part and said base structure;

a joint connecting said support part to said sensor device, said joint defining an axis;

said support part being rotatable and tiltable about said axis when the user is disposed on said support surface;

said sensor device further comprising a first section for connecting said joint to said base structure, said first section being moveable with respect to said base structure; and a second section, wherein said first section and said second section are telescopically disposed.

77. A device for simulating an activity of a user, comprising:

a base structure;

a support part;

a tiltable joint connected to the support part and allowing the support part to tilt relative to the base structure;

an axis running through the tiltable joint;

the support part comprising a support surface which can move parallel to the axis, rotate about the axis, and tilt relative to the axis;

the support surface being adapted to at least partially support the user; and a sensor device for detecting movement of the support surface, wherein the support surface is movable parallel to the axis, and rotatable and tiltable about the axis, when the user is disposed on the support surface.

* * * * *

UNITED STATES PATENT AND TRADEMARK OFFICE
CERTIFICATE OF CORRECTION

PATENT NO. : 6,624,802 B1
DATED : September 23, 2003
INVENTOR(S) : Klein et al.

It is certified that error appears in the above-identified patent and that said Letters Patent is hereby corrected as shown below:

Title page,
Item [*] Notice, delete "179" and insert -- 593 --.

Signed and Sealed this

Thirtieth Day of August, 2005

JON W. DUDAS
*Director of the United States Patent and Trademark Office*